Aug. 7, 1923.
W. W. WAINWRIGHT
COMBINATION VALVE AND DUST CAP
Filed Nov. 22, 1921
1,464,376
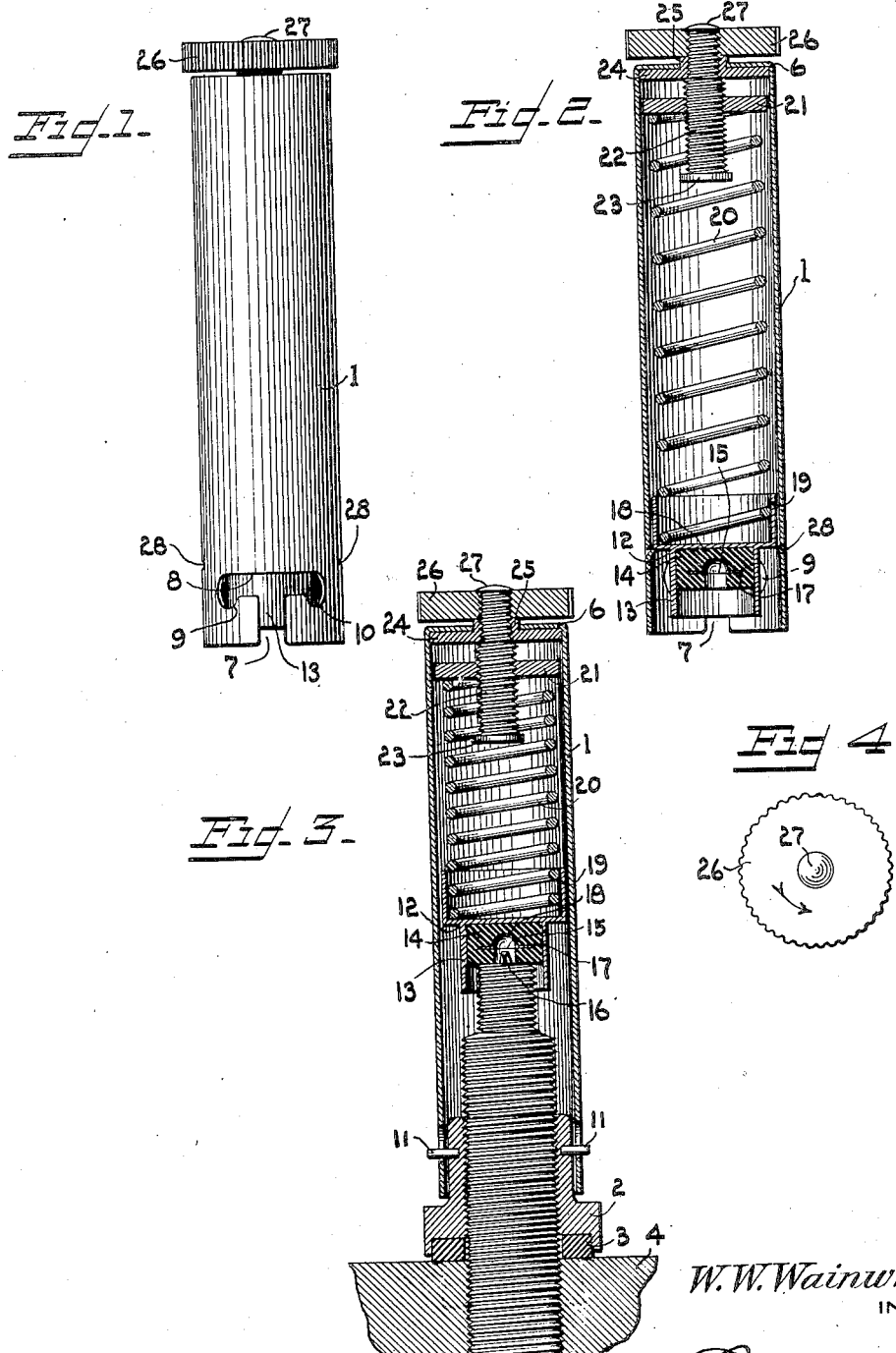
W. W. Wainwright
INVENTOR
WITNESSES Patented Aug. 7, 1923.

1,464,376

UNITED STATES PATENT OFFICE.

WILLIAM WILSON WAINWRIGHT, OF TACOMA, WASHINGTON.

COMBINATION VALVE AND DUST CAP.

Application filed November 22, 1921. Serial No. 517,054.

*To all whom it may concern:*

Be it known that I, WILLIAM W. WAINWRIGHT, a citizen of the United States, residing at Tacoma, in the county of Pierce and State of Washington, have invented a new and useful Combination Valve and Dust Cap, of which the following is a specification.

This invention relates to improvements in caps for the inflating valves of the inner tubes of pneumatic tires, and is more particularly directed to a combined valve and dust cap to take the place of the present valve and dust cap.

An object of this invention is to provide a new and improved cap for the valve stem of an inner tube, which may be readily and quickly attached or detached from said stem, and which will not only prevent water and dust from clogging the valve stem, but likewise prevent air from escaping from the valve. By means of this invention, the valve stem is rendered air-tight, and the ordinary life of the stem is lengthened, as there is no wear on the stem.

Furthermore, the construction is such that the cap may be applied to valve stems of different lengths, so that it is immaterial whether a short or long stem is used, or whether high or low pressure is contained within the tube.

The invention will be best understood from a consideration of the following detailed description taken in connection with the accompanying drawing forming part of this specification, with the understanding, however, that the invention is not confined to any strict conformity with the showing in the drawing. but may be changed and modified so long as such changes and modifications mark no material departure from the salient features of the invention as expressed in the appended claims.

In the drawing:—

Fig. 1 is an elevation of the combined valve and dust cap removed from the valve stem of the inner tube.

Fig. 2 is a vertical section of the same.

Fig. 3 is a vertical section of the combined valve and dust cap in operative position upon the valve stem of the inner tube.

Fig. 4 is a plan view of the operating wheel or knob.

Referring to the drawing, 1 indicates a cylindrical shell or cap which is adapted to be removably mounted upon a nut 2, having the washer 3 which ordinarily is screwed up tight upon the felly 4 of an automobile wheel, through a passage in which the usual valve stem 5 of the inner tube is adapted to be inserted. The outer free end of the cylindrical cap 1 is provided with a closed top 6, while the lower end is open and provided at diametrically opposite points with a pair of T-slots each having a vertical opening 7 merging into a transverse opening 8, the outer ends of which are provided with sockets 9 and 10 adapted to seat lugs 11 diametrically disposed on the nut 2.

Slidably mounted within the dust cap 1 is a follower 12 having a depending cup portion 13, in which is mounted a rubber or fabric gasket 14, having a central recess 15 to receive the outer end 16 of the valve pin. A metal disk 17, having a semi-spherical portion 18 projecting in a direction away from the valve pin 16, is secured within the rubber gasket 14 and forms a pocket for the protection of the end of the valve pin. Mounted upon the follower 12 and integrally formed therewith is an upstanding socket 19, in which the lower end of a coiled spring 20 is adapted to be received and seated.

The upper end of the coiled spring is adapted to abut a movable nut 21, which has a central internally threaded perforation adapted to receive the threads of a short operating screw 22. The lower end of the screw is provided with a circular flange 23 which acts as a stop to prevent the nut 21 from bcoming disengaged from the screw 22. The upper end of the screw is reduced in diameter and is adapted to be passed through the internally threaded central perforation in a disk 24, rotatably held within the upper end of the casing and having a boss 25 extending upwardly through a centrally disposed opening in the top 6 of the cylindrical cap 1. A knurled knob or wheel 26 likewise has an internally screw-threaded central perforation which engages the threads of the reduced portion of the screw 22, resting upon the boss 25 of the disk 24, and providing a means for manually rotating the screw 22. The outer end of the screw 22 has an upset end 27, which engages the outer surface of the knurled wheel 26 and prevents said wheel from being unscrewed from the reduced end of the screw 22 when the wheel is turned.

As has been previously stated, the device not only provides a dust-proof cap and valve for preventing leaking of the air through the valve stem 5, but it likewise provides an adjustable device which is applicable to valve stems of different lengths. The nut 21 may be adjusted vertically along the length of the screw by rotation of said screw in a direction indicated by the arrow in Fig. 4, to cause the spring 20 to be moved towards the bottom of the cylindrical cap, and force the follower 12 towards the open end of the cap, thus adapting the combined valve and dust cap for use with shorter valve stems.

A reversal of the direction of rotation of the screw will adapt the device for use with stems of greater length. In either case, whether applied to a long or short stem, the tension of the spring may be so adjusted that the pressure of the follower on the end of the valve stem will be the same. In making this adjustment the knurled head 26 and disk 24 are held against relative movement on the screw by the upset end 27 on one side and the shoulder formed by the larger portion of the screw 22 on the other side.

The cylindrical casing 1 is provided with indentations 28 near its lower end, as shown in Figs. 1 and 2, which project interiorly of the casing and engage the bottom of the pocket 19 in which the spring 20 is seated, and prevent the follower from being forced from the cylindrical casing, thereby forming a complete unitary device, all parts being self-contained within the casing 1.

The valve cap 1 is applied to the valve stem 5 of an inner tube so that the rubber gasket 14 will be seated upon the outer free end of the stem 5, with the valve pin projecting upwardly and into the protecting dome-shaped enclosure 15. The casing is then forced downwardly or inwardly by pressing upon the knurled wheel 26 until the vertical slot 7 of the T-shaped groove cut in the diametrically opposite sides of the casing 1 embrace the pins 11 projecting outwardly from the nut 2. When the pins 11 have reached the transverse groove or slot 8, the casing 1 is turned in either direction until the pins 11 are seated within the sockets 9 or 10 of the transverse groove 8. The dust cap is now in position where it cannot be readily jarred loose from its connection with the nut 2.

If it should be found that the valve stem 5 leaks, it will only be necessary to remove cap 1, pump sufficient air into the inner tube and replace the cylindrical cap in the manner that has just been stated. Then the knurled head may be turned in a direction indicated by the arrow in Fig. 4, when the nut 21 will be moved downwardly on the screw 22 and force the spring against the follower 12, causing a greater pressure of the rubber gasket on the reduced end of the valve stem 5. In this adjusted position of the nut 21, the spring is pressed against the follower 12 with a pressure which is considerably greater than the amount ordinarily used in a tire of the largest type, and no amount of expansion of the air in the tube will dislodge the follower 12 from its seating position on the end of the valve stem 5, there providing an absolute air-tight closure for the end of the valve stem.

It is common knowledge that the life of pneumatic tires depend to a considerable extent on proper inflation. With the use of present appliances, tires are not maintained at a proper air pressure. This is partly due to the fact that the operation of pumping up a tire involves loss of time with the possibility of hands and clothes being soiled in removing and replacing the ordinary dust and valve cap. Moreover, the caps themselves are frequently lost. By the present invention, the troubles incident to the use of the ordinary valve and dust cap are wholly removed, and a construction provided which makes it possible to obtain access to the valve stem for pumping up the tire in a few seconds time.

Moreover, the device prevents leakage of air through the valve, which is a common occurrence with the present type of valve caps.

What is claimed is:—

1. In a combined valve and dust cap, in combination, a casing adapted to be removably mounted on the valve stem of an inner tube, a slidably mounted follower located within the casing and adapted to engage and seal the end of the valve stem, a screw rotatably mounted in one end of the casing and operable from outside the casing, a nut on the screw adapted to be adjusted vertically within the casing by the rotation of the screw, and a compression spring engaging between the nut and follower.

2. In a combined valve and dust cap, in combination, a casing adapted to be removably mounted on the valve stem of an inner tube, a slidably mounted follower provided with oppositely disposed sockets, one of which is provided with a gasket to seal the end of the valve stem and having a recess to receive the end of the valve pin, a spring having one end seated in the other socket of the follower, a nut engaging the other end of the spring, and a screw on which the nut is threaded, said screw being rotatable to cause a vertical movement of the nut in the casing to compress the spring and change the relative clamping position of the follower with relation to the end of the valve stem.

3. In a combined valve and dust cap, in combination, a casing having a closed end, and an open end removably mounted on the valve stem of an inner tube, a spring pressed slidably mounted follower in the casing and engageable with the end of the valve stem, a screw rotatably mounted in the closed end of the casing and projecting within the casing, means on the outside of the casing for rotating the screw, and a nut on the screw adapted to be moved in the casing upon rotation of the screw for varying the position of the follower and causing the same to accommodate valve stems of varying lengths within the casing.

4. In a combined valve and dust-cap, a substantially cylindrical casing having a screw projecting longitudinally through one end, a nut within the casing having a threaded connection with the screw, a reciprocable member within the casing, a spring between the nut and reciprocable member, and means secured to the projecting end of the screw whereby the latter may be rotated to advance or retract the nut and thereby vary the action of the spring.

5. In a combined valve and dust-cap, a substantially cylindrical casing having means for attaching its inner end to a valve stem, a follower reciprocable within the casing and engageable with the end of the valve stem to seal the same, a coiled spring within the casing having one end normally engaging the follower and so tensioned as to urge the follower into engagement with the valve stem, a screw projecting through the outer end of the casing, and a nut in threaded engagement with the screw inside the casing and operable upon rotation of the screw to adjust the tension of the spring.

6. In a combined valve and dust-cap, a substantially cylindrical casing, a screw having a larger threaded portion within the casing and a smaller threaded portion extending through the end of the casing, said smaller portion terminating in an upset end, a nut in threaded engagement with the larger portion of the screw, a disk and head threaded on the smaller portion of the screw inside and outside the end of the casing respectively and held against longitudinal movement thereon by the larger portion of the screw on the one side and the upset end on the other side.

7. In a combined valve and dust-cap, the combination of a casing adapted to be removably mounted on a valve stem, a slidably mounted follower located within the casing and adapted to engage and seal the end of the valve stem, a spring having one end engaging the follower to urge it into engagement with the valve stem, a nut engageable with the other end of the spring, a screw having a larger portion in threaded engagement with the nut and a smaller threaded portion projecting through the end of the casing and having its end upset, a disk and head threaded on the smaller portion of the screw inside and outside the end of the casing respectively and held against longitudinal movement thereon by the larger portion of the screw on the one side and the upset end on the other side, whereby the rotation of said head will advance or retract the nut and vary the tension of the spring.

8. In a combined valve and dust-cap, a casing having the upper end closed and the inner end open, with slots at the open end, each of said slots having a lateral branch terminating in a downwardly-turned socket, a nut adapted to be mounted on the valve stem and having lugs engageable with the sockets, a follower loosely mounted within the casing and engaging the end of the valve stem, and spring means within the casing operating to hold the follower in firm engagement with the valve stem and the lugs in engagement with the sockets but yieldable to permit the removal or insertion of the lugs in said sockets.

In testimony that I claim the foregoing as my own, I have hereto affixed my signature.

WILLIAM WILSON WAINWRIGHT.